(12) United States Patent
Yamada et al.

(10) Patent No.: US 6,968,268 B2
(45) Date of Patent: Nov. 22, 2005

(54) MISFIRE DETECTOR FOR AN INTERNAL COMBUSTION ENGINE

(75) Inventors: Jun Yamada, Nagoya (JP); Keiji Wakahara, Inazawa (JP); Yoshinori Ma gawa, Obu (JP)

(73) Assignee: DENSO Corporation, Kariya (JP)

( * ) Notice: Subject to any disclaimer, the term of this patent is extended or adjusted under 35 U.S.C. 154(b) by 0 days.

(21) Appl. No.: 10/757,425

(22) Filed: Jan. 15, 2004

(65) Prior Publication Data

US 2004/0144165 A1    Jul. 29, 2004

(30) Foreign Application Priority Data

Jan. 17, 2003   (JP) ............................. 2003-009796
Jan. 28, 2003   (JP) ............................. 2003-018122

(51) Int. Cl.$^7$ ............................................ G06G 7/70
(52) U.S. Cl. ..................... 701/111; 701/29; 701/101; 701/102; 701/110; 73/116; 73/117.2; 73/117.3; 73/118.1
(58) Field of Search .................... 701/29, 101, 102, 701/110, 111; 73/116, 117.2, 117.3, 118.1

(56) References Cited

U.S. PATENT DOCUMENTS

| | | | |
|---|---|---|---|
| 5,452,604 A | | 9/1995 | Namiki et al. |
| 5,559,285 A | * | 9/1996 | Bryant et al. ............... 73/117.3 |
| 5,735,246 A | * | 4/1998 | Vincent et al. ............. 123/436 |
| 5,794,171 A | * | 8/1998 | Bryant et al. .................. 701/99 |
| 6,598,589 B2 | * | 7/2003 | Frelund et al. ............. 123/435 |

FOREIGN PATENT DOCUMENTS

| | | |
|---|---|---|
| JP | 03-164553 | 7/1991 |
| JP | 10-054295 | 2/1998 |

* cited by examiner

Primary Examiner—Tony M. Argenbright
Assistant Examiner—Johnny H. Hoang
(74) Attorney, Agent, or Firm—Nixon & Vanderhye P.C.

(57) ABSTRACT

A misfire detector calculates the engine speed fluctuation quantity $\Delta\omega n$ for a predetermined period of time on the basis of the average engine speed on, which is the reciprocal of the time $T120n$ that the crankshaft of the engine takes to turn 120 degrees. By comparing the calculated engine speed fluctuation quantity $\Delta\omega n$ with a misfire determination value REF, from which it can be determined whether the engine is misfiring, the misfire detector determines whether the engine is misfiring. The misfire detector detects the rotational fluctuation per combustion stroke of each engine cylinder and learns the variation of the detected rotational fluctuation values during normal combustion. From this learned value and the detected rotational fluctuation value per combustion stroke of the cylinder, the misfire detector determines whether the cylinder is misfiring or not.

22 Claims, 10 Drawing Sheets

MISFIRE DETECTOR FOR AN INTERNAL COMBUSTION ENGINE

CROSS REFERENCE TO RELATED APPLICATIONS

This application is based upon, claims the benefit of priority of, and incorporates by reference Japanese Patent Applications No. 2003-9796 filed Jan. 17, 2003, and No. 2003-18122 filed Jan. 28, 2003.

BACKGROUND

Exemplary embodiments of the present invention relate to a misfire detector for detecting a misfire in an internal combustion engine. Using engine speed fluctuation is one such way to determine misfire.

Conventional misfire detectors for internal combustion engines are disclosed in Japanese Unexamined Patent Publication Nos. H3-164553 and H6-229311. No. H3-164553 teaches obviating the need to vary a misfire determination value (slice level) according to the engine speed, reducing misfire determination value matching hour, and saving ROM capacity. No. H6-229311 teaches obviating the influence of the detection errors due to structural errors of an engine speed sensor (a crank angle sensor), which senses crankshaft rotation fluctuations, so as to accurately detect whether the engine is misfiring or not.

The negative angular acceleration (the engine speed change with time) of an internal combustion engine at the time when the engine is misfiring is proportional to the output torque of the engine at the time of combustion. If the output torque is constant, the negative angular acceleration is constant independently of the angular velocity (engine speed) of the engine. However, the computation of engine speed fluctuation quantity for misfire detection involves detecting the engine speed synchronously with the phase of crankshaft rotation. For example, this computation may involve finding the difference between the engine speeds in the same phase in two cylinders where combustion strokes are consecutive. Accordingly, the intervals at which the engine speed fluctuation quantity is calculated are inversely proportional to the engine speed. Consequently, the engine speed fluctuation quantity at the time when the engine is misfiring is inversely proportional to the engine speed.

Misfire determination values are preset at values for which variations are taken into account with respect to the engine speed fluctuation quantity at the time when the engine is misfiring. In order to match with the foregoing characteristic, conventional misfire detection involves setting misfire determination values in a map, with the engine speed and a physical quantity as parameters. The physical quantity is related with the suction air quantity, which is correlated closely with the engine output torque in the combustion strokes. The mapping makes main corrections based on the differences in engine speed fluctuation quantities due to differences in engine speed and/or engine output torque. At the same time, the mapping appropriately corrects the influence of the matching of the correlation of the suction air quantity and output torque with the engine speed, the influence of friction and other influences. See Japanese Unexamined Patent Publication No. H3-164553, pages 1 to 3, and Japanese Unexamined Patent Publication No. H6-229311, pages 2 to 3.

As stated above, the engine speed is used as a parameter in the map, according to which misfire determination values are calculated. The engine speed is detected in synchronism with the phase of the crankshaft rotation. For the same suction air quantity, the engine speed fluctuation quantity at the time when the engine is misfiring varies in a curve roughly in inverse proportion to the engine speed. Accordingly, as shown in FIG. 6, if the engine speed NE [rpm] is used as a parameter for misfire detection, the relationship between it and misfire determination values REF [rpm] needs to be set in a curve indicating that the speed NE is roughly in inverse proportion to the values REF.

In order to improve the interpolation accuracy in the map, which has a curved characteristic, it is necessary to increase the number of map points. This makes the matching hour excessive and needs greater storage capacity. Misfire determination values REF between the map points are calculated by linear interpolation. This makes it impossible to improve the accuracy in calculating misfire determination values REF.

If an internal combustion engine misfires while it is running, the engine speed falls momentarily. In view of this, as described in Japanese Unexamined Patent Publication No. H6-229311, a general misfire detector for an internal combustion engine detects the rotational fluctuation quantity for each combustion stroke of each cylinder and compares the detected quantity with a predetermined misfire determination value to determine whether the engine is misfiring or not.

Even during normal combustion, however, the detected rotational fluctuation values may vary due to the variation of combustion among the cylinders, or due to manufacturing tolerances of the crank angle sensor. The variation of the detected rotational fluctuation values due to such causes other than misfires may lower the misfire detection accuracy. In view of this, as described in Japanese Unexamined Patent Publication No. H10-54295, another misfire detector for an internal combustion engine learns the variation of detected rotational fluctuation values during normal combustion and corrects these values with the learned variation so as to detect misfires without being influenced by the variation of combustion among the cylinders and/or the manufacturing tolerances.

In general, even while an internal combustion engine is not running (the ignition switch is off), learned values for misfire determination need to be stored and held so that they can be used after the engine starts up the next time. Therefore, as described in Japanese Unexamined Patent Publication No. H10-54295, a backup RAM, which has a backup power supply, is used as a memory for storing the learned values. Normally, the backup power supply is supplied with a supply voltage from the battery mounted in the vehicle. If the battery is removed from the vehicle, the backup RAM is not supplied with voltage, so that the learned values stored in this RAM disappear. Accordingly, if the battery is removed from the vehicle, any occurring misfire cannot be detected until the next learning is finished with a battery mounted in the vehicle. In this case, the engine is controlled with a misfire being misjudged as normal combustion.

In general, learning is inhibited when an internal combustion engine is misfiring, and the variation of detected rotational fluctuation values is learned only during normal combustion. As stated above, however, if the removal of the battery from the vehicle makes it impossible to detect misfires, the variation of detected rotational fluctuation values at the time when the engine is misfiring is misjudged and learned as the variation of detected rotational fluctuation values during normal combustion until the misfire detector returns to its normal condition where it can normally detect misfires. This worsens the learning accuracy, thus worsening the misfire detection accuracy.

The foregoing problems may conceivably be solved by the replacement of the backup RAM with an EEPROM or another rewritable nonvolatile memory, which requires no backup power supply, as a memory for storing the learned values. The learned values stored in the nonvolatile memory are rewritten every time a learned value is computed while the engine is running. As is well known, however, an EEPROM or the like can be rewritten only a limited number of times. Consequently, an EEPROM or the like cannot be used, but a backup RAM needs to be used. Using RAM as a memory device means that for a long period, of say, fifteen or more years, an unknown and very high number of rewrites can occur.

SUMMARY

In view of the foregoing problems, one aspect of exemplary embodiments of the present invention to provide a misfire detector for an internal combustion engine that makes it possible to reduce the matching hour and improve the interpolation accuracy by making it possible to obtain, by means of simple matching, a map according to which misfire determination values can be calculated.

According to a first aspect of the invention, the misfire detector for an internal combustion engine has a map, an engine speed fluctuation computing means and a misfire detecting means. The map stores various misfire determination values for different engine rotation periods. On the basis of the engine speed, the engine speed fluctuation computing means calculates the engine speed fluctuation quantity for a predetermined period of time. The misfire detecting means compares the calculated engine speed fluctuation quantity with one of the stored misfire determination values to determine whether the engine is misfiring. The misfire determination values are roughly proportional to the engine rotation periods, and the relationship between the values and the periods is linear. Consequently, a map for the calculation of misfire determination values can be obtained by means of simple matching. This makes it possible to reduce the matching time for making the map and improve the interpolation accuracy in calculating the misfire determination values on the basis of the map.

In a second aspect of the invention, the engine speed fluctuation computing means calculates the engine speed difference between the engine speeds in the present and last combustion strokes of consecutive combustion strokes of the engine every time the crankshaft makes one rotation. From the present and last calculated engine speed differences, the engine speed fluctuation computing means suitably calculates the engine speed fluctuation for the predetermined period of time. The fluctuation calculation involves comparing the present engine speed difference with the last engine speed difference. Consequently, the present engine speed difference is calculated as a value not affected by the errors owing to component tolerances etc. at the time of engine speed detection. Accordingly, by comparing the engine speed fluctuation quantity for the predetermined period of time with one of the misfire determination values, it is possible to accurately determine whether the engine is misfiring.

According to a third aspect of the invention, the engine speed fluctuation computing means calculates the engine speed difference between the engine speeds in the same phase in the present and last combustion strokes of consecutive combustion strokes of the engine every time the crankshaft makes one rotation. This makes it possible to more suitably calculate the engine speed fluctuation quantity at the time when the engine is misfiring.

According to a fourth aspect of the invention, each of the engine rotation periods is calculated on the basis of the latest information on the period of time that the crankshaft takes to make one rotation. This makes it possible to calculate the average rotation period for the predetermined period of time suitably without being influenced by the detection error per crank angle of the crankshaft.

In further consideration, another aspect of the present invention is to provide a misfire detector for the internal combustion engine of a vehicle that can hold storage of learned values for misfire determination even when the battery mounted in the vehicle is removed, so that a misfire can be detected with practical accuracy after a point when the engine has just started after the battery is replaced. Another aspect of the invention is to provide a misfire detector that can be used for a long time, such as the life of the engine.

In order to achieve the immediately preceding object, the misfire detector according to a fifth aspect of the present invention for the internal combustion engine of a vehicle has a RAM and a rewritable nonvolatile memory as a storing means for storing the value for misfire determination learned by a learning means. The learned value stored in the RAM is rewritten every time the learning means computes a new learned value. The learned value stored in the nonvolatile memory is rewritten only on a predetermined condition. Consequently, even if the learned value is computed (the RAM is rewritten) many times while the engine is running, the number of times the learned value in the nonvolatile memory is rewritten can be limited to a relatively small number. This makes it possible to use the nonvolatile memory for a long time. The learned value varies slowly due to aging or the like. Accordingly, even though the misfire detector limits the number of times the learned value in the nonvolatile memory is rewritten, it is possible to secure the practical accuracy of the learned value stored and held in the nonvolatile memory. This makes it possible to detect a misfire with practical accuracy by using the learned value in the nonvolatile memory after a point when the engine has just started after the battery mounted in the vehicle is replaced.

According to a sixth aspect of the invention, the learned value stored in the nonvolatile memory may be rewritten every time the vehicle or engine has run once or a predetermined number of times. According to the seventh aspect, the stored value may be rewritten every time a predetermined period of time passes or every time the vehicle has run a predetermined distance. According to an eighth aspect of the invention, the stored value may be rewritten every time a misfire is detected. In any of these cases, the number of times the stored value is rewritten can be limited to a guaranteed number or a smaller number.

The RAM is rewritten every time a new learned value is computed while the engine is running. According to a ninth aspect of the invention, the RAM may be a backup RAM having a backup power supply that is always supplied with a supply voltage from the battery mounted in the vehicle. When the battery is not removed from the vehicle, it is possible to detect a misfire with accuracy by using the latest learned value in the backup RAM after a point when the engine has just started.

According to a tenth aspect of the invention, if the data stored in the backup RAM disappears, that is, is erased, when the battery is removed, the learned value stored in the nonvolatile memory may be written in the RAM when the backup power supply of the RAM is restored. This makes it possible to accurately detect a misfire, after the battery is replaced, by writing in the backup RAM the learned value in the nonvolatile memory after a point when the engine has just started.

According to an eleventh aspect of the invention, the learned value stored in the nonvolatile memory may be rewritten when the ignition switch of the vehicle is turned off. The stored value may be written in the RAM during the initialization performed immediately after the ignition switch is turned on. Generally, the battery is removed from the vehicle while the engine is not running after the ignition switch is turned off. Accordingly, if the learned value stored in the nonvolatile memory is rewritten when the ignition switch is turned off, the latest learned value can be stored in the nonvolatile memory while the engine is not running. This makes it possible to accurately detect a misfire by writing in the RAM the latest learned value in the nonvolatile memory after a point when the engine has just started after the battery is replaced. The RAM, in which the learned value is written, may be a general RAM having no backup power supply or, of course, a backup RAM having a backup power supply.

DETAILED DESCRIPTION OF THE PREFERRED EMBODIMENTS

Figure 1:
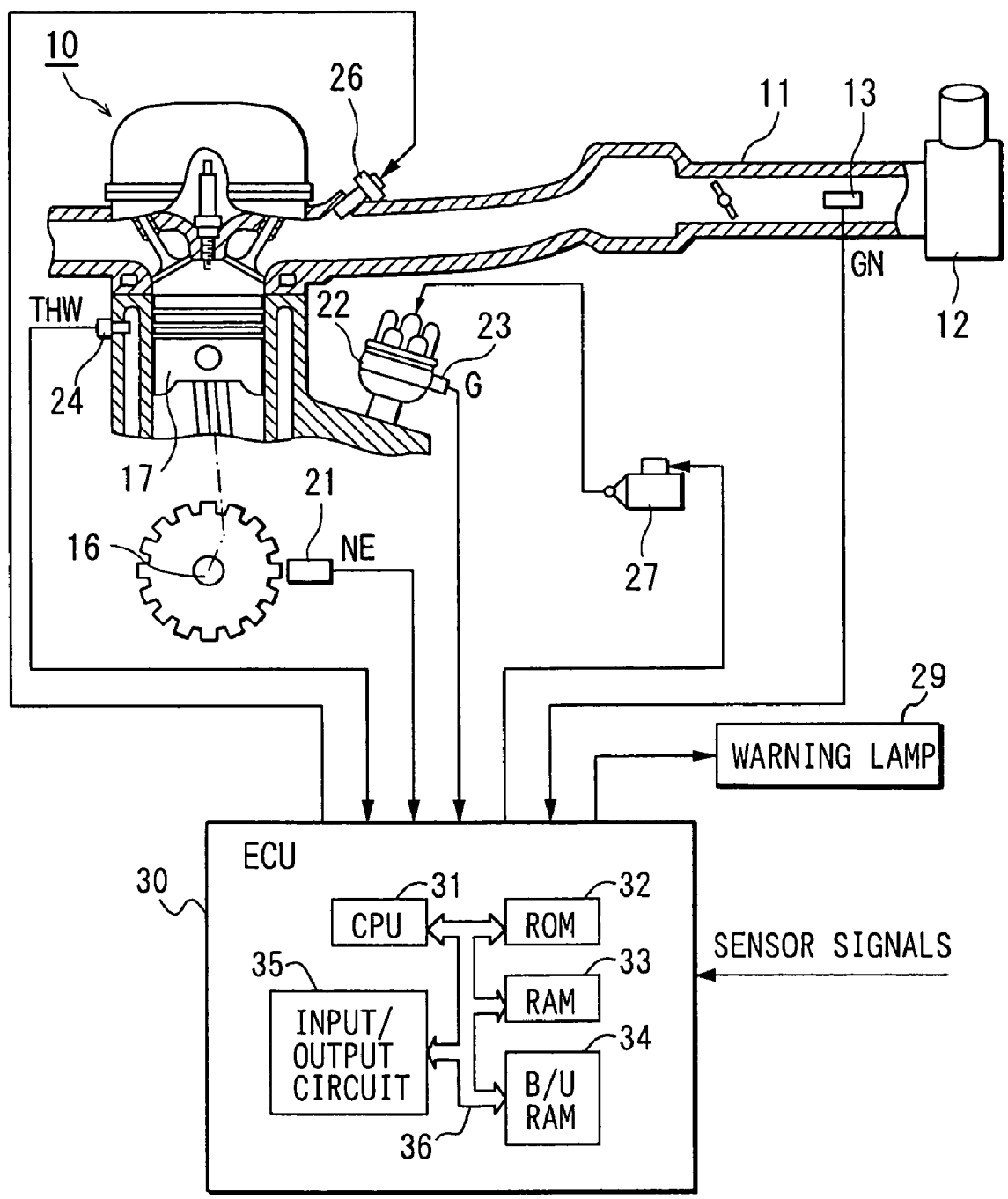
FIG. 1 is a diagram of an internal combustion engine and peripheral equipment, to which a misfire detector in a first embodiment is applied.

FIG. 1 schematically shows an internal combustion engine 10 and peripheral equipment, to which a misfire detector embodying the present invention is applied.

The engine 10 is a four-cycle engine having six cylinders, #1–#6. The engine 10 is supplied with air drawn from the air cleaner 12 through the suction duct 11. The suction duct 11 is fitted with an air flow meter or another air quantity sensor 13 for sensing the amount of suction air GN [g/rev] flowing into the duct 11.

The crankshaft 16 of the engine 10 is fitted with a speed sensor 21. Every time the crankshaft 16 has turned a predetermined crank angle, the speed sensor 21 outputs a signal, from which the engine speed NE [rpm] can be determined. The distributor 22 has a built-in reference position sensor 23, which outputs a signal for the discrimination of a particular cylinder of the engine 10. For example, the reference position sensor 23 senses the reference position G for every compression top dead center at the time when the piston 17 in the cylinder #1 is at its top position. The cooling water passage of the engine 10 is fitted with a water temperature sensor 24, which senses the cooling water temperature THW in degrees C.

An electronic control unit 30 receives various sensor signals, which represent the amount of suction air GN sensed by the suction quantity sensor 13, the engine speed NE sensed by the speed sensor 21, the reference position G sensed by the reference position sensor 23, the cooling water temperature THW sensed by the water temperature sensor 24, etc. The electronic control unit 30 computes the optimum controlled variables in the fuel system and the ignition system and outputs control signals for accurately controlling the injectors (fuel injection valves) 26, the igniters 27, etc.

The electronic control unit 30 is a logic circuit including a CPU 31, which can execute various known operations, a ROM 32, a RAM 33, a backup RAM 34, an input/output circuit 35 and a bus line 36. The ROM 32 stores a control program, a control map, etc. The RAM 33 stores various data etc. The bus line 36 connects these devices. If the electronic control unit 30 determines that a misfire is occurring in the engine, a warning lamp 29 warns the driver etc. of the occurrence.

Figure 2:
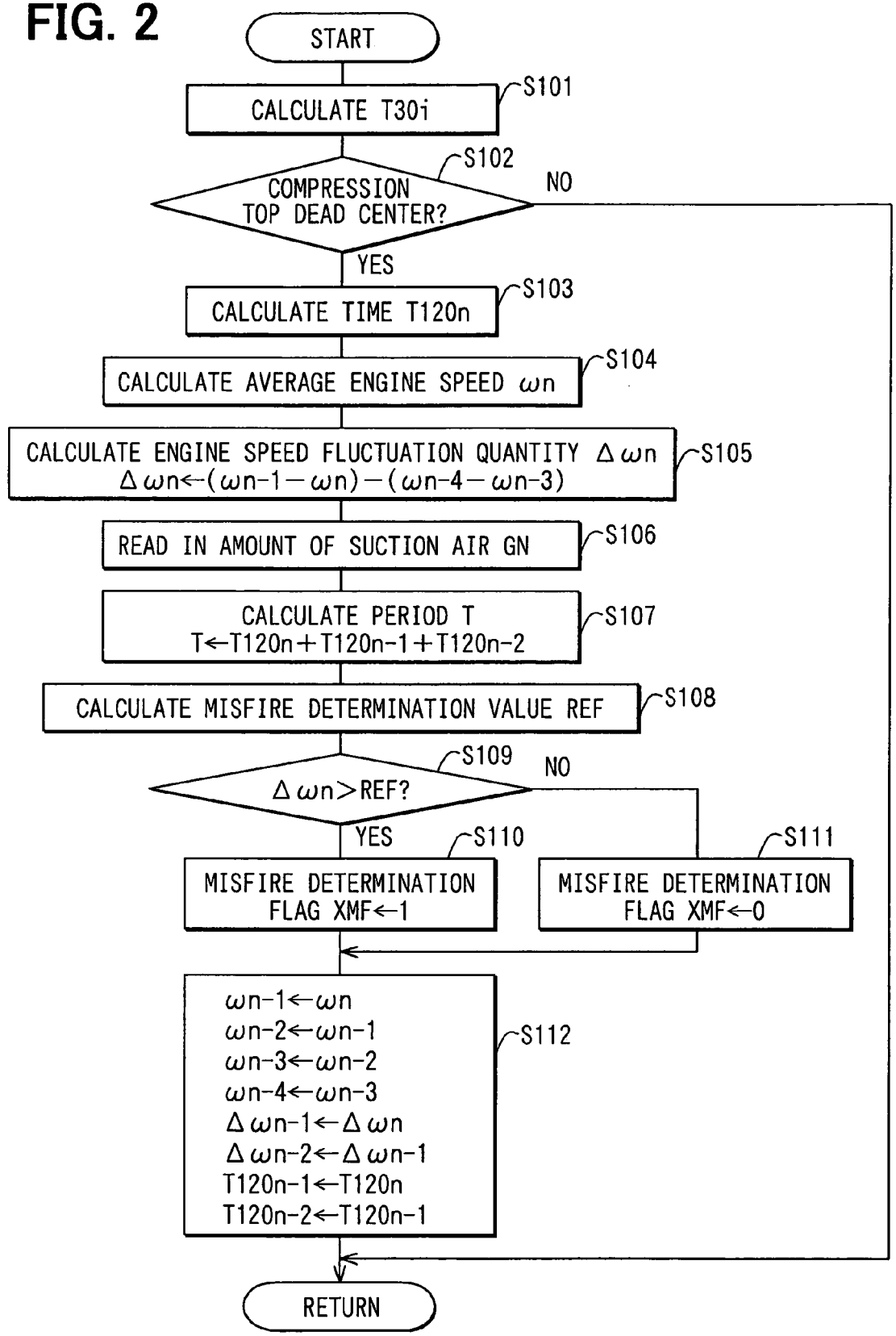
FIG. 2 is a flowchart of the misfire determination routine executed by the CPU of the electronic control unit used in a misfire detector of the first embodiment of the present invention.
Figure 3:
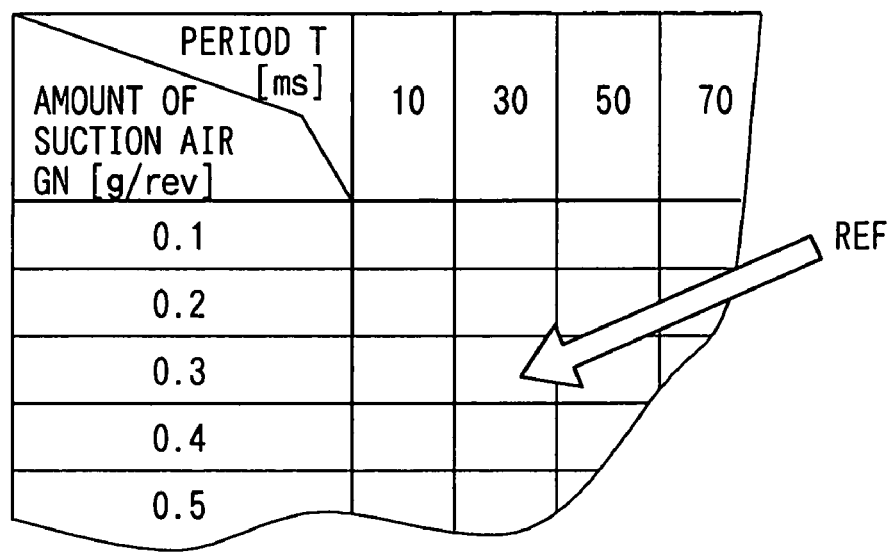
FIG. 3 is a map for the calculation of misfire determination values using, as parameters, the amount of air drawn into the engine and crankshaft rotation periods.

FIG. 2 shows a misfire determination routine, which can be executed by the CPU 31 of the electronic control unit 30. FIG. 3 is a map for the calculation of misfire determination values REF. In FIG. 2, it can be determined from misfire determination values REF whether the engine 10 is misfiring while running. Misfire determination values REF can be calculated from the amount of suction air GN [g/rev] and crankshaft rotation periods T [ms] as parameters. Crankshaft rotation periods T will be mentioned later. The misfire determination routine is executed repeatedly by the CPU 31 by interrupting every time the crankshaft 16 has turned for the predetermined crank angle, which may be 30 degrees.

In FIG. 2, the first step S101 is to calculate the present time T30$i$ that the crankshaft 16 takes to turn for the crank angle of 30 degrees. The present time T30$i$ is calculated from the difference between the last and present interrupt times. The next step S102 is to determine whether the present interrupt timing is the compression top dead center in any of the cylinders, #1–#6. If the present interrupt timing is not the compression top dead center, the misfire determination routine ends.

If the present interrupt timing is at the compression top dead center position in any of the cylinders #1–#6, the misfire determination routine goes to step S103. Step S103 is to accumulate the present time T30$i$ calculated at step S101 and the times T30$i$-1, T30$i$-2 and T30$i$-3 calculated in the last execution, the last execution but one, and the last execution but two, respectively. The sum of the times T30$i$, T30$i$-1, T30$i$-2 and T30$i$-3 is the time T120$n$ that the crankshaft 16 takes to turn for a crank angle of 120 degrees.

The next step S104 is to calculate the present average engine speed ωn, which is the reciprocal of the time T120$n$. The next step S105 is to calculate the present engine speed fluctuation quantity Δωn by the following expression (1).

$$\Delta\omega n \leftarrow (\omega n-1-\omega n)-(\omega n-4-\omega n-3) \quad (1)$$

ωn-1, ωn-3 and ωn-4 are the average engine speeds calculated in the last execution, the last execution but two and the last execution but three, respectively. (ωn-1−ωn) is the latest engine speed difference between the cylinders where no combustion stroke fails. (ωn-4−ωn-3) is the engine speed difference at a 360-degree-backward crank angle between the cylinders where no combustion stroke fails. This makes it possible to calculate the engine speed fluctuation quantity on the same tooth of the engine speed sensor 21, making it possible to obviate the errors owing to component tolerances of the teeth of this sensor 21.

The latest engine speed difference (ωn-1−ωn) and the engine speed difference (ωn-4−ωn-3) at 360 degrees backward are calculated at the same time by the expression (1).

Alternatively, the latest engine speed difference (ωn-1−ωn) might be stored in the RAM 33 as the engine speed difference (ωn-4−ωn-3) at 360 degrees backward in the next operation. By reading this engine speed difference (ωn-4−ωn-3) from the RAM 33, it would be possible to calculate the engine speed fluctuation quantity Δωn without calculating the engine speed difference (ωn-4−ωn-3) at 360 degrees backward in each operation.

The next step S106 is to read in the amount of suction or drawn air GN [g/rev] from the suction quantity sensor 13. The next step S107 is to calculate a crankshaft rotation period T [ms], which the crankshaft 16 takes to make one rotation. The calculation is based on the following expression (2).

$$T \leftarrow T120n + T120n\text{-}1 + T120n\text{-}2 \quad (2)$$

The next step S108 is to calculate a misfire determination value REF, from which it can be determined whether the engine 10 is misfiring. The calculation is based on the map shown in FIG. 3, where the amount of suction air GN [g/rev] read in at step S106, and the crankshaft rotation period T [ms] calculated at step S107, are parameters. Misfire determination values REF for intermediate values between the parameters in FIG. 3 can be found by interpolation operation. That is, FIG. 3 is a map for the calculation of misfire determination values from the amount of air drawn into the engine and crankshaft rotation periods as parameters. In FIG. 2, it can be determined from the misfire determination values whether the engine is misfiring while running.

The next step S109 is to determine whether the present engine speed fluctuation quantity Δωn, which has been calculated at step S105, exceeds the misfire determination value REF calculated at step S108. If this engine speed fluctuation quantity Δωn is larger than the misfire determination value REF, the misfire determination routine goes to step S110 of setting a misfire determination flag XMF at 1, which indicates that the engine 10 is misfiring. If the engine speed fluctuation quantity Δωn is equal to or smaller than the misfire determination value REF, the routine goes to step S111 of setting the misfire determination flag XMF at 0, which indicates that the engine 10 is not misfiring.

Step S110 or S111 is followed by step S112 of updating the present average engine speed ωn and the last three average engine speeds ωn-1, ωn-2 and ωn-3 to the last four average engine speeds ωn-1, ωn-2, ωn-3 and ωn-4, respectively, updating the present and last engine speed fluctuation quantities Δωn and Δωn-1 to the last two engine speed fluctuation quantities Δωn-1 and Δωn-2, respectively, and updating the present and last times T120$n$ and T120$n$-1 to the last two times T120$n$-1 and T120$n$-2. Thereafter, the misfire determination routine ends.

Figure 4:
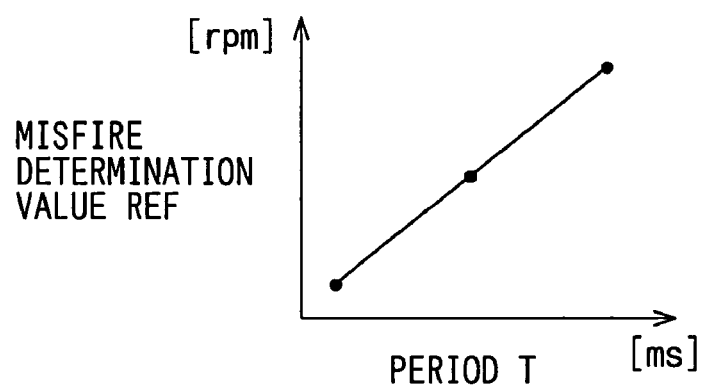
FIG. 4 is a graph of the relationship between the crankshaft rotation periods and misfire determination values used in the first embodiment of the misfire detector according to exemplary embodiments of the present invention.

In the map of FIG. 3, which is used in the misfire determination routine, misfire determination values REF can be calculated from the amount of suction air GN [g/rev] and crankshaft rotation periods T [ms] as parameters. If the amount of suction air GN [g/rev] is constant, the relationship between crankshaft rotation periods T [ms] and misfire determination values REF [rpm] can be set linearly so that the periods T are roughly proportional to the values REF, as shown in FIG. 4. The reason for this will be explained below.

While the vehicle is running at a constant speed, the output torque Te of the engine 10 balances with the load torque W, so that the relationship between them can be expressed by the following expression (3):

$$Te - W = I^*(d\omega/dt) \quad (3)$$

where I is the moment of inertia.

If the cylinder for which the present average engine speed, ωn, is calculated is misfiring, so that the output torque Te is 0, and if the cylinder for which the last average engine speed, ωn-1, was calculated is not misfiring, the expression (3) is expressed by the following expression (4).

$$-W = I^*(d\omega/dt) \approx I^*(\omega n - \omega n\text{-}1)/T120n \quad (4)$$

If the cylinders for which the last average engine speed but two, ωn-3, and the last average engine speed but three, ωn-4, were calculated are not misfiring, the expression (3) is expressed by the following expression (5).

$$Te - W = I^*(d\omega/dt) \approx I^*(\omega n\text{-}3 - \omega n\text{-}4)/T120n \quad (5)$$

The subtraction of the expression (4) from the expression (5) gives the following expression (6).

$$Te \approx I^*\{(\omega n\text{-}1-\omega n)-(\omega n\text{-}4-\omega n\text{-}3)\}/T120n \quad (6)$$

Accordingly, the following expression (7) is roughly valid.

$$Te^*T120n \propto \{(\omega n\text{-}1-\omega n)-(\omega n\text{-}4-\omega n\text{-}3)\} \quad (7)$$

The absolute magnitude of T120$n$ is sufficiently large even in comparison with the fluctuation quantity in a case where the engine 10 is misfiring. For simpler explanation, the absolute magnitude of T120$n$ is constant in both cases where the engine 10 is misfiring and where the engine 10 is not misfiring. Because the amount of suction air GN∝Te is roughly valid, the following expression (8) is given.

$$GN^*T \propto GN^*T120n \propto \{(\omega n\text{-}1-\omega n)-(\omega n\text{-}4-\omega n\text{-}3)\} \quad (8)$$

This indicates that the misfire determination values REF preset at values for which variations are taken into account with respect to the engine speed fluctuation quantity $\{(\omega n\text{-}1-\omega n)-(\omega n\text{-}4-\omega n\text{-}3)\}$ at the time when the engine 10 is misfiring are proportional to crankshaft rotation periods T. It is, accordingly, possible to make these relationships roughly linear by using crankshaft rotation periods T as a parameter in the map from which misfire determination values REF can be found.

Figure 5:
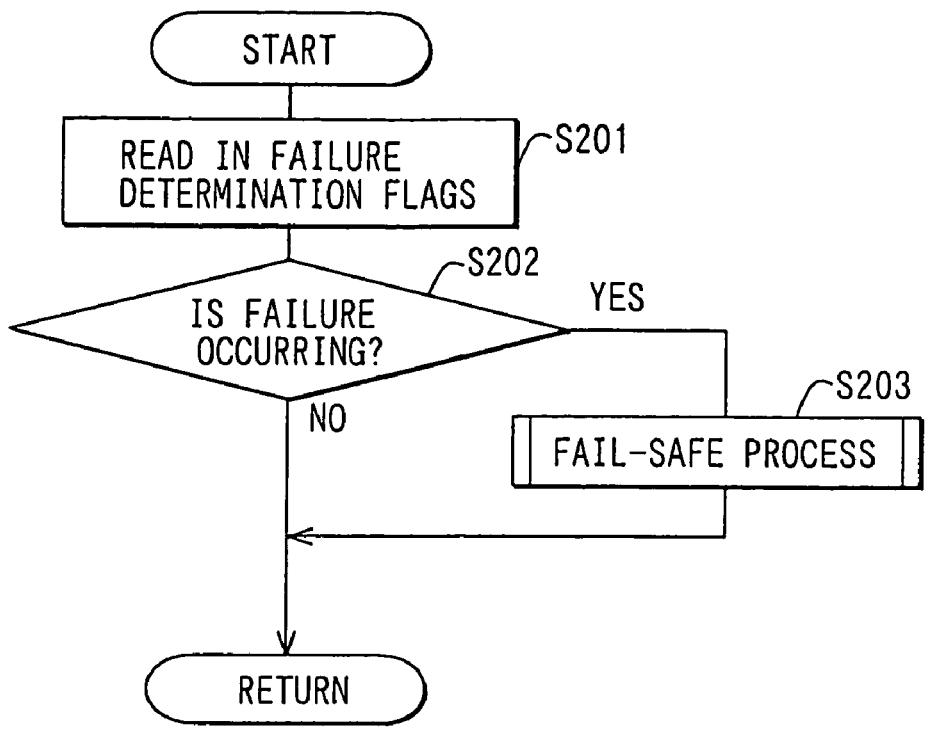
FIG. 5 is a flowchart of the failure diagnosis routine executed by the CPU.
Figure 6:
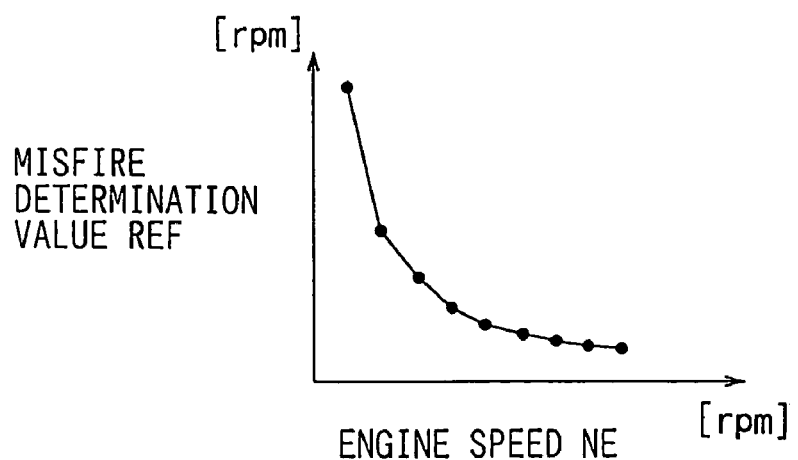
FIG. 6 is a graph of the relationship between the engine speeds and misfire determination values used in the misfire detector of a conventional internal combustion engine.

FIG. 5 shows a failure diagnosis routine, which is executed at regular intervals by the CPU 31 of the electronic control unit 30. In FIG. 5, the first step S201 is to read in the states of various failure determination flags, which include the misfire determination flag XMF of the misfire determination routine. The next step S202 is to determine, on the basis of the read flag states, whether a failure is occurring in the engine 10. If the states of all the failure determination flags are 0 because no failure is occurring, the failure diagnosis routine ends.

If the state or states of one or more of the failure determination flags are 1, step S202 is followed by step S203 of executing one or more known fail-safe processes, each of which is associated with a type of failure detection. For example, if it is determined that one of the cylinders is misfiring, the state of the misfire determination flag XMF is set at 1. In this case, one type of failure detection is to stop the fuel supply to this particular cylinder so as to protect the catalyst (not shown) and so as to prevent the concentration of the HC (hydrocarbon) in the exhaust gas from increasing. Another type of failure detection is to light the warning lamp 29 so as to warn the driver etc. of the occurrence of the misfire. After this step S203, the failure diagnosis routine ends.

Thus, the misfire detector comprises an engine speed fluctuation computing means and a misfire detecting means, which are realized by the electronic control unit 30. The engine speed fluctuation computing means calculates the engine speed fluctuation quantity $\Delta\omega$n for a predetermined period of time on the basis of the average engine speed $\omega$n, which is the reciprocal of the time that the crankshaft 16 takes to turn for the crank angle of 120 degrees as the predetermined period of time and that the engine speed sensor 21 senses. On the basis of the calculated engine speed fluctuation quantity $\Delta\omega$n and a misfire determination value REF, from which it can be determined whether the engine 10 is misfiring, the misfire detecting means detects a misfire in the engine 10. Misfire determination values REF are stored in advance in the map, each as a value associated with a crankshaft rotation period T.

In other words, misfire determination values REF are mapped in advance with crankshaft rotation periods T as a parameter (FIG. 3), and are stored in the ROM 32. By comparing the engine speed fluctuation quantity $\Delta\omega$n for the predetermined period of time with a misfire determination value REF, it is possible to determine whether the engine 10 is misfiring. Misfire determination values REF are roughly proportional to crankshaft rotation periods T, and the relationship between the values REF and the periods T is linear. Consequently, the map for the calculation of misfire determination values REF can be obtained by means of simple matching. This makes it possible to reduce the matching time for making the map and improve the interpolation accuracy in calculating misfire determination values REF on the basis of the map.

The engine speed fluctuation computing means calculates the engine speed fluctuation quantity $\Delta\omega$n for the predetermined period of time on the basis of the engine speed difference ($\omega$n-1-$\omega$n) in the present combustion stroke of consecutive combustion strokes and the engine speed difference ($\omega$n-4-$\omega$n-3) at the crank angle of 360 degrees backward. In other words, these engine speed differences ($\omega$n-1-$\omega$n) and ($\omega$n-4-$\omega$n-3) make it possible to suitably calculate the engine speed fluctuation quantity $\Delta\omega$n not affected by the errors owing to component tolerances etc. of the teeth of the engine speed sensor 21 for the predetermined period of time. By comparing this engine speed fluctuation quantity $\Delta\omega$n with a misfire determination value REF, it is possible to accurately determine whether the engine 10 is misfiring.

By using the engine speeds in the same phase in the present and last combustion strokes, it is possible to calculate an accurate engine speed fluctuation quantity $\Delta\omega$n without errors owing to component tolerances etc. of the teeth of the engine speed sensor 21. This makes it possible to more suitably calculate the engine speed fluctuation quantity $\Delta\omega$n in a case where the engine 10 is misfiring.

Each crankshaft rotation period T is calculated on the basis of the latest measured period of time that the crankshaft 16 takes to make one rotation. Each crankshaft rotation period T, which is calculated on the basis of the latest information on the period of time that the crankshaft 16 takes to make one rotation, is the average rotation period for the period of time when the engine speed fluctuation quantity is calculated. Crankshaft rotation periods T can be suitably found without being affected by the detection error per crank angle of the crankshaft 16.

Hereinbefore, the engine 10 has been described as a four-cycle engine having six cylinders, #1–#6. However, an internal combustion engine to which a misfire detector according to exemplary embodiments of the present invention can be applied is not limited to a four-cycle engine having six cylinders. In brief, the engine speed fluctuation quantity may be calculated from the engine speeds in the same phase in consecutive combustion strokes of the engine.

(Second Embodiment)

Figure 7:
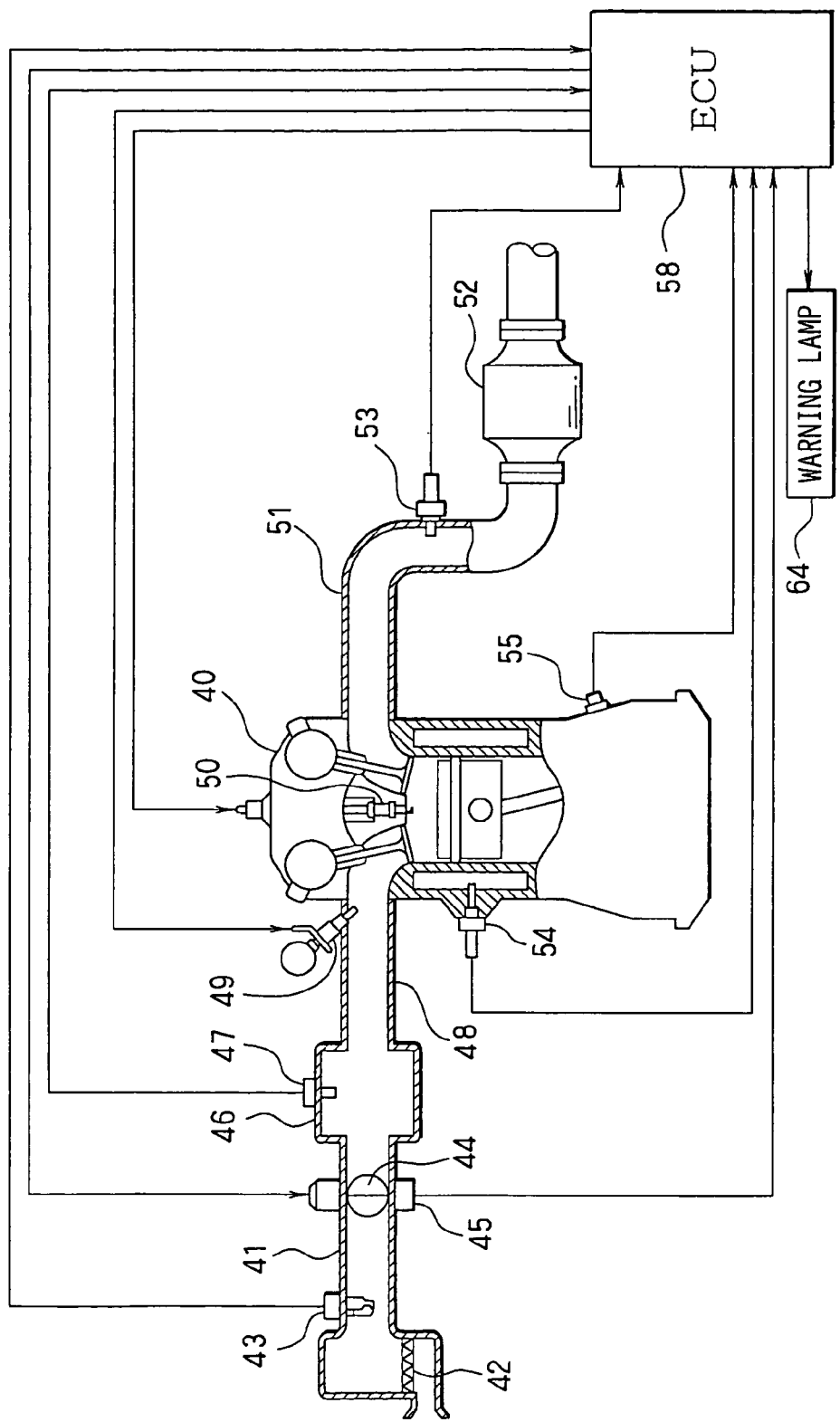
FIG. 7 is a diagram of an engine control system in a second embodiment of the present invention.
Figure 8:
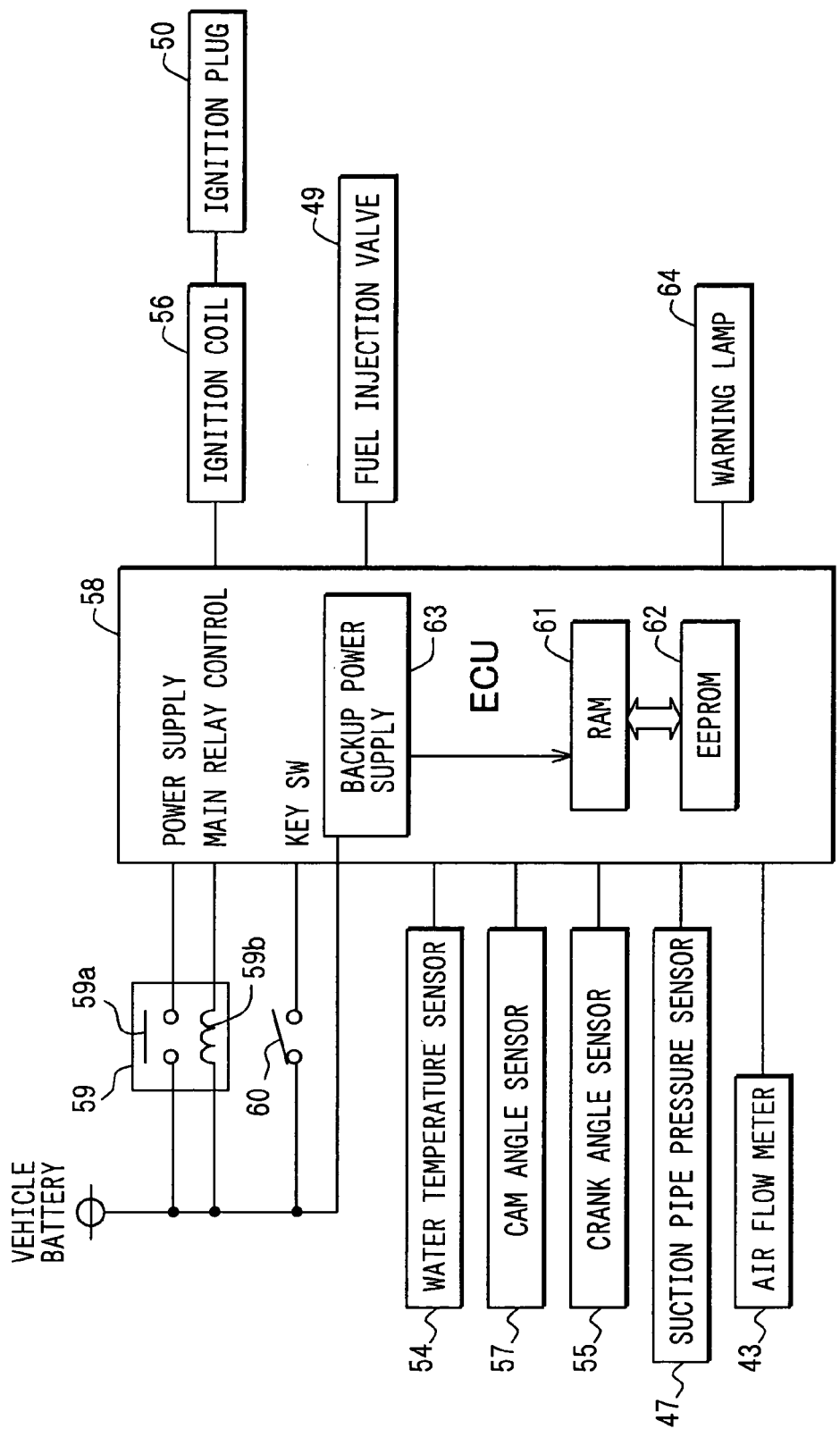
FIG. 8 is a block diagram of the engine control system in the second embodiment of the present invention.

The second embodiment of the present invention will be described below with reference to FIGS. 7–14. FIG. 7 schematically shows a structure of an engine control system. With reference to FIG. 7, the internal combustion engine 40 of a vehicle has a suction pipe 41. The upstream end of the suction pipe 41 is connected to an air cleaner 42. The suction pipe 41 is fitted with an air flow meter 43 downstream of the cleaner 42. The flow meter 43 senses the amount of suction air. The suction pipe 41 is also fitted with a throttle valve 44 and a throttle opening sensor 45 downstream of the flow meter 43. The opening of the throttle valve 15 can be sensed by the throttle opening sensor 45 and adjusted by a DC motor or the like.

The downstream end of the suction pipe 41 is connected with a surge tank 46, which is downstream of the throttle valve 44. The surge tank 46 is fitted with a pressure sensor 47 for sensing the pressure in the suction pipe. The surge tank 46 is connected with the upstream end of an intake manifold 48 for supplying air to the suction ports of the cylinders of the engine 40. The suction manifold 48 is fitted with fuel injection valves 49, each near one of the suction ports. The cylinder head of the engine 40 is fitted with ignition plugs 50, each for one of the cylinders. An ignition coil 56 (FIG. 8) generates high voltage in synchronism with the ignition timing. The high voltage is applied to each of the ignition plugs 50.

The exhaust pipe 51 of the engine 40 is fitted with a catalyst 52 and an exhaust gas sensor 53, which is located upstream of the catalyst 52. The catalyst 52 purges CO, HC, NOx, etc. in the exhaust gas. The gas sensor 53 may be an air-fuel ratio sensor or an oxygen sensor, which senses the air-fuel ratio of the exhaust gas or detects whether the gas is lean or rich. The cylinder block of the engine 40 is fitted with a water temperature sensor 54 and a crank angle sensor 55. The temperature sensor 54 senses the temperature of the cooling water. The angle sensor 55 outputs a pulse signal every time the crankshaft of the engine 40 has turned for a predetermined crank angle, which, for example, may be 30 degrees. A crank angle can be detected from a count of the pulse signals output from the angle sensor 26. The engine speed can be detected from the period (the intervals) at which the pulse signals are output. The cylinder head of the engine 11 is fitted with a cam angle sensor 57 (FIG. 8), which outputs cylinder discrimination signals in synchronism with the rotation of the cam shaft. Cylinder discrimination is based on the discrimination signals from the cam angle sensor 57 and a count of the pulse signals from the crank angle sensor 55.

The signals output from the various sensors are input to an engine control unit (circuit) 58. The engine control unit 58 has a power-supply terminal, which can be supplied with a supply voltage from the vehicle battery (not shown) via a main relay 59. The engine control unit 58 also has a key switch terminal, to which an on-off signal of the ignition switch 60 can be input. The main relay 59 has a relay contact 59a and a relay coil 59b for driving the contact 59a. The engine control unit 58 further has a main relay control terminal, which is connected with the relay coil 32b. When the ignition switch 60 is turned on, an electric current flows through the relay coil 59b, thereby turning on the relay contact 59a, so that the engine control unit 58 is supplied with the supply voltage. When the supply of electricity to the relay coil 59b is cut off, the relay contact 59a is turned off, so that the electric power supply to the engine control unit 58 is cut off.

The engine control unit 58 has a RAM 61 as a storing means and an EEPROM 62, which is a rewritable nonvolatile memory. The engine control unit 58 also has a backup power supply 63, which is always supplied with the supply voltage from the vehicle battery. The backup power supply 63 supplies the RAM 61 with an operating voltage. Thus, the RAM 61 is a backup RAM, which holds stored data even while the engine 40 is not running.

The main component of the engine control unit 58 is a microcomputer with a built-in ROM, which stores various engine control programs. By executing these programs, the engine control unit 58 controls the fuel injection quantity of each fuel injection valve 49 and the ignition timing of each ignition plug 50 according to the running condition (state) of the engine 40.

Figure 9:
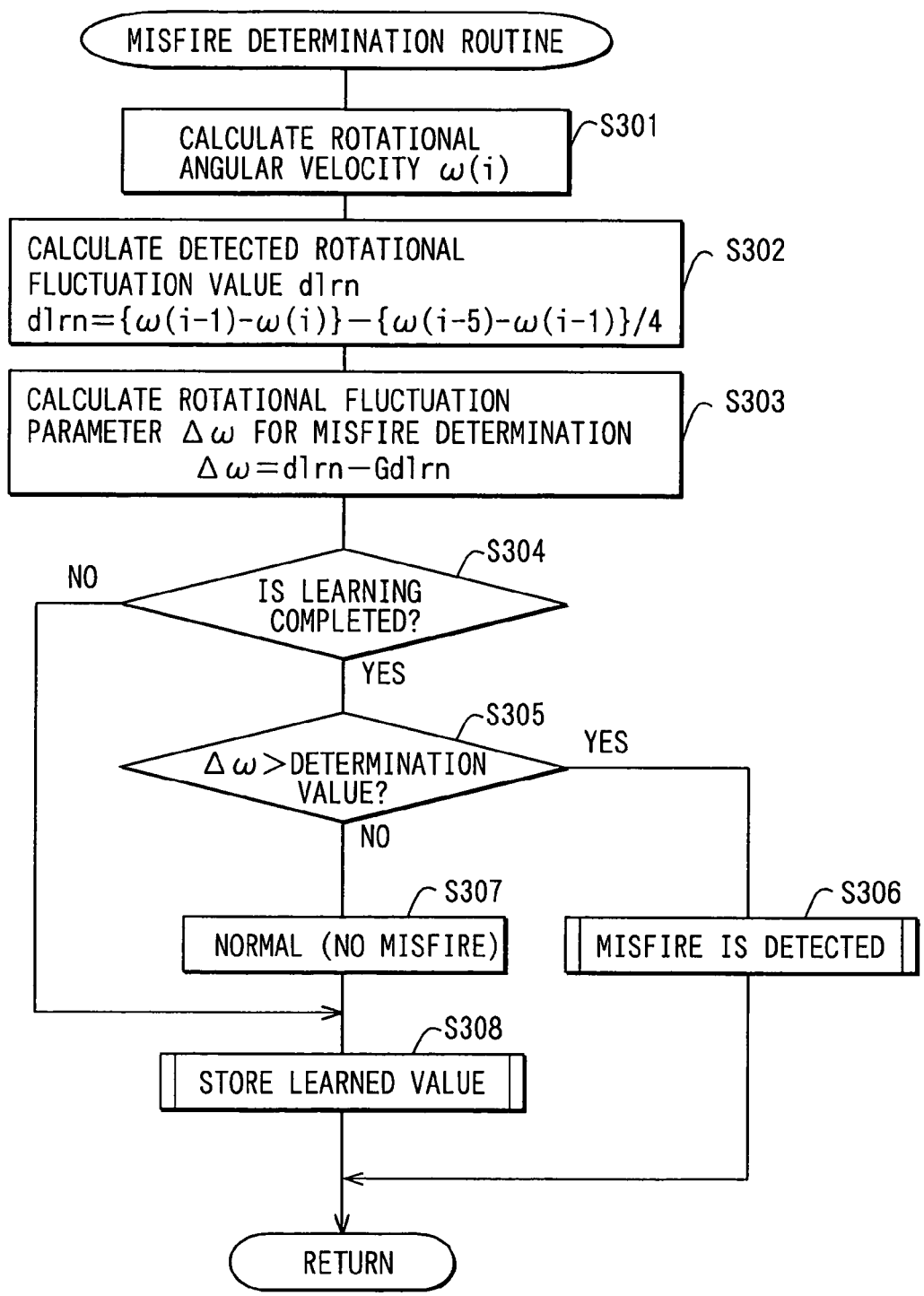
FIG. 9 is a flowchart of the misfire determination routine of the second embodiment.

FIG. 9 is a misfire determination routine. By executing the misfire determination routine while the engine 40 is running, the engine control unit 58 detects the rotational fluctuation per combustion stroke of each cylinder, learning the variation of the detected rotational fluctuation values during normal combustion, and determining from this learned value and the detected rotational fluctuation value per combustion stroke of the cylinder whether the cylinder is misfiring or not. If a misfire is detected, a warning lamp 64 is lit. Alternatively, misfire warning might be indicated on a warning indicator of the instrument panel.

Figure 10:
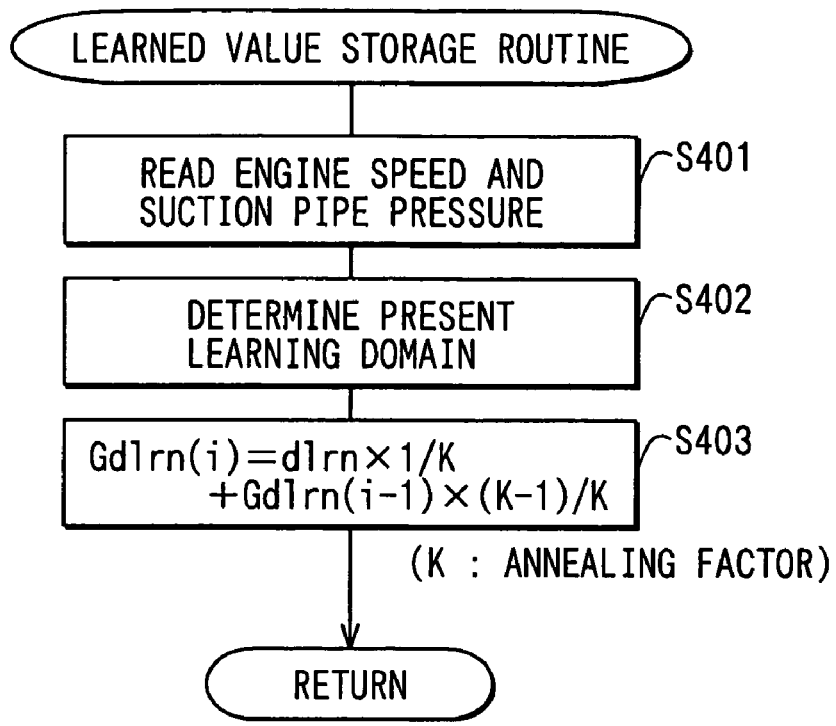
FIG. 10 is a flowchart of the learned value storage routine of the second embodiment.
Figure 13:
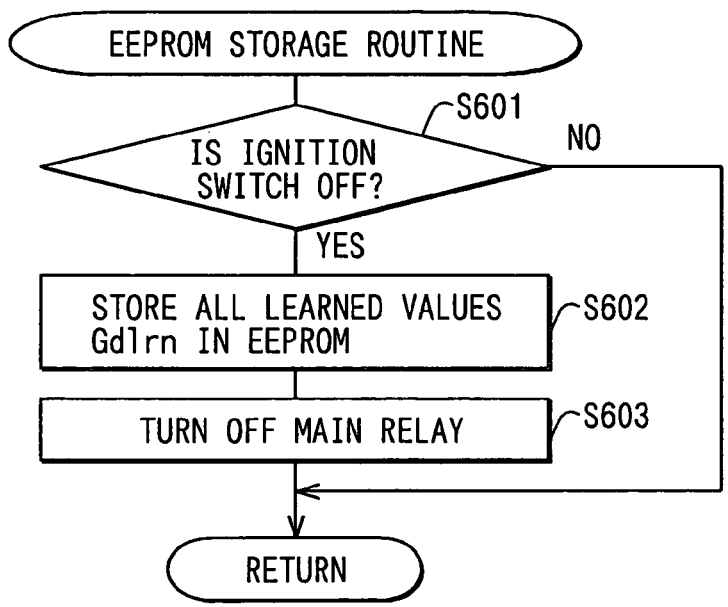
FIG. 13 is a flowchart of the EEPROM storage routine of the second embodiment.
Figure 14:
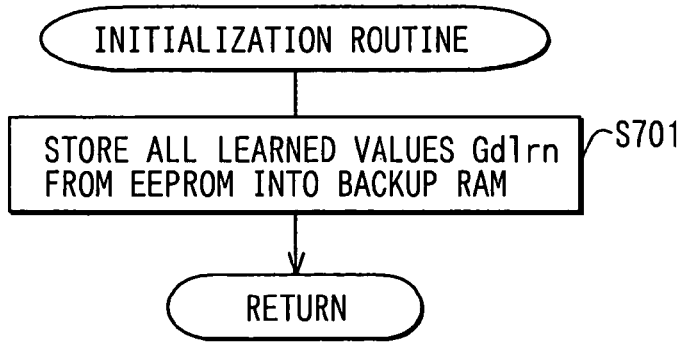
FIG. 14 is a flowchart of the initialization routine of the second embodiment.

FIG. 10 is a learned value storage routine, by which the learned values stored in the backup RAM 61 are rewritten every time a new learned value is computed while the engine 40 is running. FIG. 13 shows an EEPROM storage routine, by which the latest learned value stored in the backup RAM 61 is written into the EEPROM 62 when the ignition switch 60 is turned off, and by which the main relay 59 is thereafter turned off, so that the electric power supply to the engine control unit 58 is cut off.

The misfire determination routine and learned value storage routine, which the engine control unit 58 executes, will be described below in detail. The misfire determination routine, which is shown in FIG. 9, is started by an interrupt every time the crankshaft has turned for the predetermined crank angle, which, for example, may be 30 degrees, while the engine 11 is running. The starting of the misfire determination routine is followed by step 301. At step 301 the time that the crankshaft has taken to turn for the crank angle for one stroke is calculated. This is 180 degrees for a four-cylinder engine. At Step 301, the present rotational angular velocity $\omega(i)$ is calculated from the calculated time.

The next step 102 is to calculate a detected rotational fluctuation value dlrn by the following expression:

$$dlrn=\{\omega(i\text{-}1)-\omega(i)\}-\{\omega(i\text{-}5)-\omega(i\text{-}1)\}/4$$

where $\omega(i\text{-}1)$ is the rotational angular velocity at the time prior to the current time by one stroke (the cylinder for the last combustion stroke), and $\omega(i\text{-}5)$ is the rotational angular velocity at the time prior to the current time by five strokes (by one cycle of the cylinder of the present combustion stroke). $\{\omega(i\text{-}1)-\omega(i)\}$ is the rotational fluctuation quantity between the cylinders where no combustion stroke fails. $\{(\omega(i\text{-}5)-\omega(i\text{-}1)\}$ is the rotational fluctuation quantity for one cycle of the cylinder of the present combustion stroke. Steps 301 and 302 serve as the rotational fluctuation detecting means.

The calculation of the detected rotational fluctuation value dlrn is followed by step 303. Step 303 is to subtract a learned value Gdlrn from this detected value dlrn to find a rotational fluctuation parameter $\Delta\omega$ for misfire determination.

$$\Delta\omega=dlrn-Gdlrn$$

Figure 11:
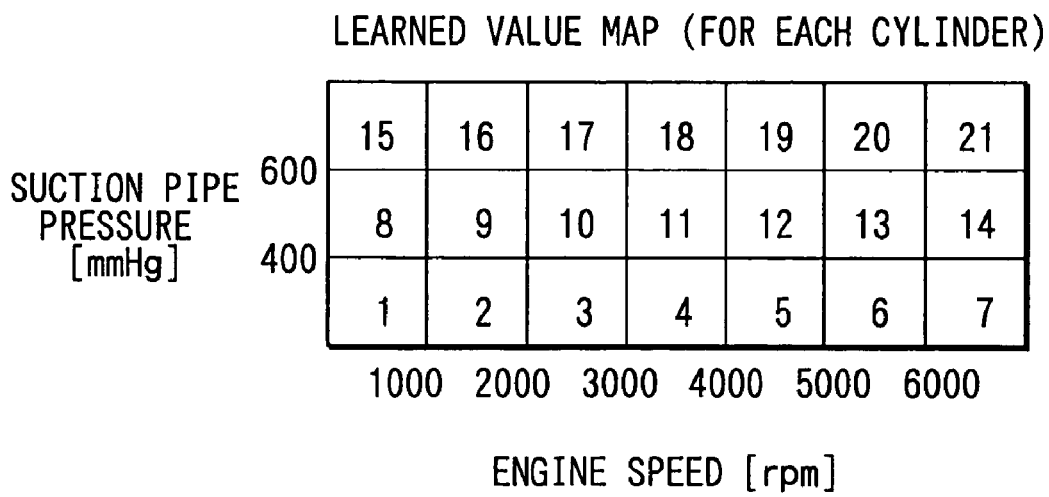
FIG. 11 is a map of learned values of the second embodiment.
Figure 12:
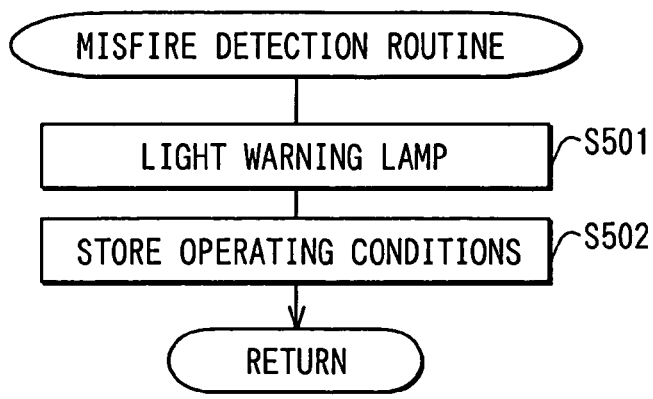
FIG. 12 is a flowchart of the misfire detection routine of the second embodiment.

The learned value Gdlrn is read out according to the present operating conditions (engine speed and suction pipe pressure) from the learned value map (FIG. 11 stored in the backup RAM 34. The next step, step 304 determines whether the learning of detected rotational fluctuation value dlrn is finished. If the learning is not completed, the misfire determination routine goes to step 308. Step 308 is to execute the learned value storage routine, which is shown in FIG. 10, to compute a learned value Gdlrn in the way described below and to store the computed value in the backup RAM 34.

The first step, step 401 is to read in the present engine speed and suction pipe pressure. The next step, step 402 is to determine which learning domain of the learned value map of the cylinder for the present combustion stroke is to be learned. The next step, step 403 is to read out the learned value Gdlrn(i-1) stored in the present learning domain. Step 403 is also to compute a new learned value Gdlrn(i) from the read value Gdlrn(i-1) and the detected rotational fluctuation value dlrn by the following annealing expression to rewrite the learned value Gdlrn in the present learning domain:

$$Gdlrn(i)=dlrn\times 1/K+Gdlrn\ (i\text{-}1)\times(K\text{-}1)/K$$

where K is an annealing factor. The learned value storage routine, which is shown in FIG. 10, serves as the learning means.

When the learned values Gdlrn in all the learning domains of the learned value map for each cylinder have been updated (rewritten) a predetermined number of times, the learning of the detected rotational fluctuation values dlrn is completed. This causes step 304 of FIG. 9 to result in yes and be followed by step 305. Step 305 compares the rotational fluctuation parameter $\Delta\omega$ for misfire determination with a predetermined determination value so as to determine whether the engine 40 is misfiring. Step 305 serves as the misfire determining means.

If the rotational fluctuation parameter $\Delta\omega$ for misfire determination is larger than the determination value, it is determined that the engine 40 is misfiring. In this case, the misfire determination routine goes to step 306 of executing the misfire detection routine shown in FIG. 12. The first step 501 of this detection routine is to light the warning lamp 64. The next step 502 is to store the data on the operating conditions at the time of misfire detection in the backup RAM 61.

If the rotational fluctuation parameter $\Delta\omega$ for misfire determination is equal to or smaller than the determination value, it is determined that the engine 40 is not misfiring (step 307). In this case, the misfire determination routine goes to step 308 of executing the learned value storage routine, which is shown in FIG. 10, to learn the detected rotational fluctuation value dlrn. When a misfire is detected, the detected rotational fluctuation value dlrn is not learned. Only during normal combustion is the detected rotational fluctuation value dlrn learned.

FIG. 13 shows an EEPROM storage routine, which is executed periodically while the main relay 59 is on so that the engine control unit 58 is supplied with electric power. The starting of the storage routine is followed by step 601 of determining whether the ignition switch 60 is turned off or not. If the ignition switch 60 is not turned off, the storage routine ends. Thereafter, when the ignition switch 60 is turned off, the EEPROM storage routine goes to step 602. Step 602 is to store in the EEPROM 62 the learned values Gdlrn of all the domains of the learned value map for each cylinder that are stored in the backup RAM 61. The next step 603 is to turn off the main relay 59 so as to cut off the electric power supply to the engine control unit 58.

Accordingly, while the ignition switch 60 is on, the learned values Gdlrn stored in the EEPROM 62 are not rewritten. Only when the ignition switch 60 is turned off, the learned values Gdlrn in the EEPROM 62 are rewritten. While the engine 40 is not running, the learned values Gdlrn in the EEPROM 62 are held even if the vehicle battery is removed.

When the ignition switch 60 is turned on while the engine 40 is not running, the main relay 59 is turned on, so that the engine control unit 58 is supplied with electric power. This causes the initialization routine shown in FIG. 14 to be executed. By the initialization routine, the learned values Gdlrn, which are stored in the EEPROM 62, at the time when the ignition switch 60 was turned off the last time, are written in the backup RAM 61.

Thus, when the ignition switch 60 is turned off, the latest learned value Gdlrn is stored in the EEPROM 62. When the ignition switch 60 is turned on, the latest learned value Gdlrn stored in the EEPROM 62 is written in the backup RAM 61. If the vehicle battery is removed while the engine 40 is not running, the data stored in the backup RAM 61 disappears, that is, the data is erased. Thereafter, when the engine 40 starts with a battery mounted in the vehicle, the latest learned value Gdlrn stored in the EEPROM 62 is written in the backup RAM 61, so that misfires can be detected accurately after a point when the engine 40 has just started. Moreover, only when the ignition switch 60 is turned off, the learned values Gdlrn stored in the EEPROM 62 are rewritten. Consequently, even if learned values Gdlrn are computed (the RAM 61 is rewritten) many times while the engine 40 is running, the number of times the learned values Gdlrn in the EEPROM 62 are rewritten can be limited to a small number. This makes it possible to use the EEPROM 62 for a long time.

As previously stated, the learned values Gdlrn computed while the engine 40 is running are stored in the backup RAM 61. Alternatively, if there is room in the storage capacity of the RAM built into the engine control unit 58, the learned values Gdlrn computed while the engine 40 is running might be stored in the built-in RAM (without a backup power supply). In this case, while the engine 40 is not running, the data stored in this RAM disappears. However, by writing in this RAM the learned values Gdlrn stored in the EEPROM 62 when the ignition switch 60 is turned on, it is possible to achieve the same effect as in this embodiment.

The detected rotational fluctuation values dlrn, the learned values Gdlrn and the rotational fluctuation parameter $\Delta\omega$ for misfire determination might be computed by other suitable methods. For example, these values and parameters might be expressed not as rotational angular velocity, but as the time (period) that the crankshaft has taken to turn for the predetermined crank angle.

(Third Embodiment)

In the second embodiment, when the ignition switch 60 is turned on, the learned values Gdlrn stored in the EEPROM 62 are written in the backup RAM 61. Even while the engine 40 is not running, the learned values Gdlrn in the backup RAM 61 are held if the vehicle battery is not removed, that is, disconnected. Accordingly, only when the vehicle battery is removed while the engine 40 is not running, the learned values Gdlrn in the EEPROM 62 might be written in the backup RAM 61.

Figure 15:
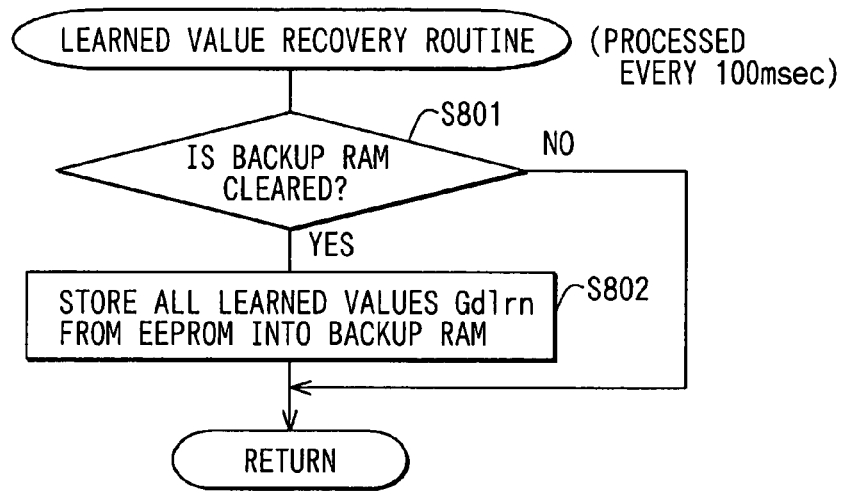
FIG. 15 is a flowchart of the learned value recovery routine of a third embodiment of the present invention.

This is embodied by the third embodiment of the present invention. In the third embodiment, the learned value recovery routine shown in FIG. 15 is executed in place of the initialization routine shown in FIG. 14. The learned value recovery routine is executed at regular intervals (for example, of 100 ms) while the engine control unit 58 is supplied with electric power (while the main relay 59 is on). The starting of the recovery routine is followed by step 801 of determining whether the backup RAM 61 has been cleared by the removal of the vehicle battery. If the backup RAM 61 has not been cleared (if the vehicle battery has not been removed), the learned value recovery routine ends without rewriting the data stored in the backup RAM 61.

If it is determined at step 801 that the backup RAM 61 has been cleared (if the vehicle battery has been removed), the learned value recovery routine goes to step 802. Step 802 is to write in the backup RAM 61 the learned values Gdlrn, which are stored in the EEPROM 62, at the time when the ignition switch 60 was turned off the last time.

The second and third embodiments produce the same effect.

(Fourth Embodiment)

In the second and third embodiments, the learned values Gdlrn stored in the EEPROM 62 are rewritten when the ignition switch 33 is turned off. Alternatively, the learned values Gdlrn stored in the EEPROM 62 might be rewritten when a misfire is detected.

Figure 16:
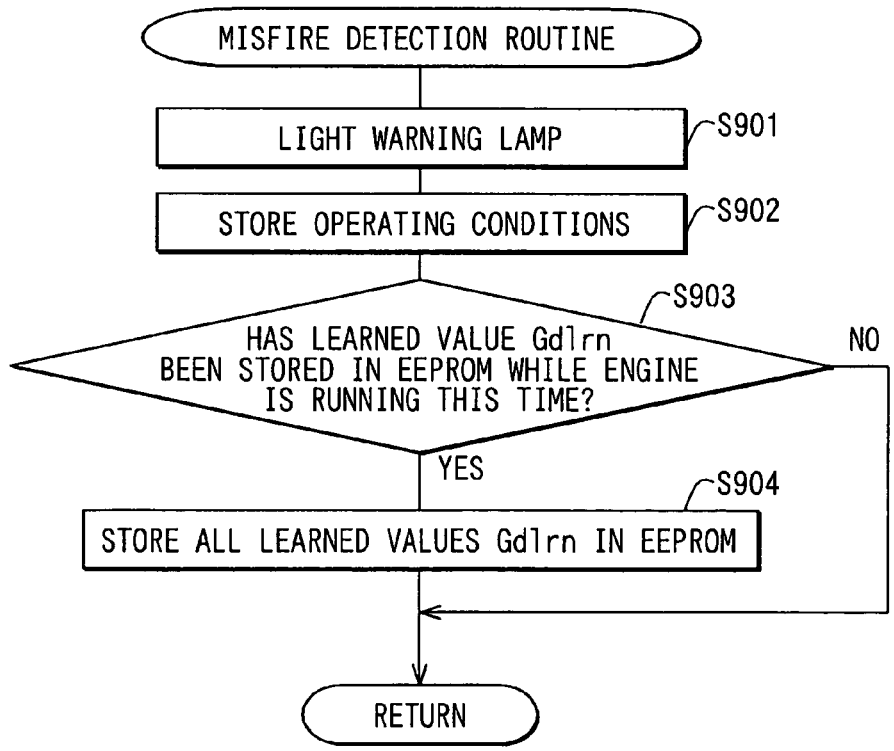
FIG. 16 is a flowchart of the misfire detection routine of a fourth embodiment of the present invention.

This is embodied by the fourth embodiment of the present invention. In the fourth embodiment, the misfire detection routine shown in FIG. 16 is executed when a misfire is detected by the misfire determination routine, which is also depicted in FIG. 9. The first step 901 of this detection routine is to light the warning lamp 64. The next step 902 is to store the data on the operating conditions at the time of misfire detection in the backup RAM 61. The next step 903 is to determine whether a learned value Gdlrn has been stored or not in the EEPROM 62 while the engine 40 is running for this time. If a learned value Gdlrn has been stored in the EEPROM 62 while the engine 40 is running for this time, the misfire detection routine shown in FIG. 16 goes to step 904. Step 904 stores the data on the learned value Gdlrn at the time of misfire detection in the EEPROM 35.

If no learned value Gdlrn has been stored in the EEPROM 35 while the engine 11 is running for this time, the misfire detection routine shown in FIG. 16 ends, or rather, returns. The second and fourth embodiments produce the same effect.

(Other Embodiments)

The timing condition at which the learned values Gdlrn stored in the EEPROM 35 are rewritten is not limited to that in each of the foregoing embodiments. The stored values Gdlrn might be rewritten every time the number of runs (how many times the ignition switch 33 has been turned on/off) reaches a predetermined value. The stored values Gdlrn might be rewritten at regular intervals (for example, every time a predetermined cumulative operating time passes). The stored values Gdlrn might be rewritten every time the vehicle has run a predetermined distance. The stored values Gdlrn might be rewritten every time the alternating quantity of learned values Gdlrn or the number of operations reaches a predetermined value. In brief, the stored values Gdlrn might be rewritten at such intervals that the EEPROM 62 might be rewritten the guaranteed or a smaller number of times within the warranty period of the vehicle.

The EEPROM 62 may store data on the operating conditions at the time of misfire detection, in addition to learned values Gdlrn. In this case, it is preferable that the data on the operating conditions at the time of misfire detection be written in the backup RAM 61 when the learned values Gdlrn in the EEPROM 62 are written in it. Additionally, the nonvolatile memory that stores learned values Gdlrn is not limited to the EEPROM 62, but may be a flash memory or another rewritable nonvolatile memory.

What is claimed is:

1. A misfire detector of an internal combustion engine utilizing a crankshaft capable of rotating, the detector comprising:
    a map for storing misfire determination values as a basis for determining engine misfiring, the map adopting a plurality of crankshaft rotation periods as parameters such that each misfire determination value is associated with one of the plurality of crankshaft rotation periods;
    means for computing an engine speed fluctuation quantity, according to an engine speed, for a predetermined period of time; and
    means for detecting a misfire according to the stored misfire determination values and the computed engine speed fluctuation quantity.

2. The misfire detector according to claim 1, wherein the engine speed fluctuation computing means calculates an engine speed difference between a present engine speed and a prior combustion stroke of consecutive combustion strokes of the engine every time the crankshaft makes one rotation, and wherein the engine speed fluctuation computing means calculates the engine speed fluctuation quantity for a predetermined period of time according to a present and a prior calculated engine speed difference.

3. The misfire detector according to claim 2, wherein the engine speed fluctuation computing means calculates an engine speed difference between same phase engine speeds of present and last combustion strokes of consecutive combustion strokes every time the crankshaft makes one rotation.

4. The misfire detector according to claim 1, wherein each of the crankshaft rotation periods is calculated according to a latest measured time that the crankshaft takes to make one rotation.

5. A misfire detector for an internal combustion engine of a vehicle, comprising:
    means for detecting rotational fluctuation values of the engine;
    means for learning variation values of the rotational fluctuation values detected by the rotational fluctuation detecting means;
    means for determining from the variation values learned by the learning means and the rotational fluctuation value detected by the rotational fluctuation detecting means to determine whether the engine is misfiring;
    a random access memory (RAM) for storing the learned value; and
    a rewritable nonvolatile memory for storing the learned value, wherein the learned value stored in the RAM is rewritten every time the learning means computes a new learned value; and
    wherein the learned value stored in the nonvolatile memory is rewritten only on a predetermined condition.

6. The misfire detector according to claim 5, wherein the learned value stored in the nonvolatile memory is rewritten every time the engine has run once or a predetermined number of times.

7. The misfire detector according to claim 5, wherein the learned value stored in the nonvolatile memory is rewritten every time a predetermined period of time passes or every time the vehicle has run a predetermined distance.

8. The misfire detector according to claim 5, wherein the learned value stored in the nonvolatile memory is rewritten every time a misfire is detected.

9. The misfire detector according to claim 5, wherein the RAM has a backup power supply supplied with a voltage from a battery mounted in the vehicle.

10. The misfire detector according to claim 9, wherein if the data stored in the RAM is erased when the battery is removed, the learned value stored in the nonvolatile memory is written in the RAM when the backup power supply of the RAM is restored.

11. The misfire detector according to claim 5, wherein the learned value stored in the nonvolatile memory is rewritten when an ignition switch of the vehicle is turned off, and wherein the stored value is written in the RAM during the initialization performed immediately after the ignition switch is turned on.

12. A method of detecting a misfire of an internal combustion engine utilizing a crankshaft, the method comprising:
    storing misfire determination values in a map as a basis for determining engine misfiring, the map adopting a plurality of crankshaft rotation periods as parameters such that each misfire determination value is associated with one of the plurality of crankshaft rotation periods;
    computing an engine speed fluctuation quantity, according to an engine speed, for a predetermined period of time; and
    detecting a misfire according to the stored misfire determination values and the computed engine speed fluctuation quantity.

13. The method according to claim 12, wherein an engine speed difference between a present engine speed and a prior combustion stroke of consecutive combustion strokes of the engine is calculated every time the crankshaft makes one rotation, and wherein the engine speed fluctuation quantity for a predetermined period of time according to a present and a prior calculated engine speed difference is calculated.

14. The method according to claim 13, wherein an engine speed difference between same phase engine speeds of present and last combustion strokes of consecutive combustion strokes is calculated every time the crankshaft makes one rotation.

15. The method according to claim 12, wherein each of the crankshaft rotation periods is calculated according to a latest measured time that the crankshaft takes to make one rotation.

16. A method of detecting a misfire in an internal combustion engine of a vehicle, the method comprising:
   detecting rotational fluctuation values of the engine;
   determining variation values of the detected rotational fluctuation values;
   determining from the determined variation values and the detected rotational fluctuation value whether the engine is misfiring;
   storing the determined value in a random access memory (RAM); and
   storing the determined value in a rewritable nonvolatile memory, wherein the determined value stored in the RAM is rewritten every time a new determined value is computed; and
   wherein the determined value stored in the nonvolatile memory is rewritten only on a predetermined condition.

17. The method according to claim 16, wherein the determined value stored in the nonvolatile memory is rewritten every time the engine has run once or a predetermined number of times.

18. The method according to claim 16, wherein the determined value stored in the nonvolatile memory is rewritten every time a predetermined period of time passes or every time the vehicle has run a predetermined distance.

19. The method according to claim 16, wherein the determined value stored in the nonvolatile memory is rewritten every time a misfire is detected.

20. The method according to claim 16, wherein the RAM has a backup power supply supplied with a voltage from a battery mounted in the vehicle.

21. The method according to claim 20, wherein if the data stored in the RAM is erased when the battery is removed, the determined value stored in the nonvolatile memory is written in the RAM when the backup power supply of the RAM is restored.

22. The method according to claim 16, wherein the determined value stored in the nonvolatile memory is rewritten when an ignition switch of the vehicle is turned off, and wherein the stored value is written in the RAM during the initialization performed immediately after the ignition switch is turned on.

* * * * *

UNITED STATES PATENT AND TRADEMARK OFFICE
CERTIFICATE OF CORRECTION

PATENT NO. : 6,968,268 B2  Page 1 of 1
DATED : November 22, 2005
INVENTOR(S) : Yamada et al.

It is certified that error appears in the above-identified patent and that said Letters Patent is hereby corrected as shown below:

<u>Title page,</u>
Item [56], Inventors, change "Yoshinori Magawa" to -- Yoshinori Maegawa --.

Signed and Sealed this

Seventh Day of March, 2006

JON W. DUDAS
*Director of the United States Patent and Trademark Office*